Aug. 22, 1950        H. W. EKHOLM        2,519,896
BRAKE BEAM WITH MOUNTING ELEMENTS

Filed Jan. 5, 1948        2 Sheets-Sheet 1

INVENTOR:
HERBERT W. EKHOLM
BY Rodney Bedell
ATTORNEY

Aug. 22, 1950 — H. W. EKHOLM — 2,519,896
BRAKE BEAM WITH MOUNTING ELEMENTS
Filed Jan. 5, 1948 — 2 Sheets-Sheet 2

INVENTOR:
HERBERT W. EKHOLM
BY Rodney Bedell
ATTORNEY.

Patented Aug. 22, 1950

2,519,896

UNITED STATES PATENT OFFICE 2,519,896

BRAKE BEAM WITH MOUNTING ELEMENTS

Herbert W. Ekholm, Chicago, Ill., assignor to Chicago Railway Equipment Company, Chicago, Ill., a corporation of Illinois Application January 5, 1948, Serial No. 521

21 Claims. (Cl. 188—221.1)

The invention relates to the construction of a railway truck brake beam and its supporting upon the truck.

It is a practice to support the brake beam at its ends by brackets on the truck side frames on which the brake beam slides to and from the truck wheels during application and release of the brakes. Usually the ends of the beam and the cooperating brackets on the side frames have flat interengaging surfaces which hold the beam against tilting about its longitudinal axis. If the side frames tilt lengthwise of the truck, or move vertically, relative to one another during movement of the truck, the brackets at opposite sides of the truck become disaligned and the brake beam structure is put under severe torsion or shear which may cause the compression member, tension rod, or beam ends to fail. Furthermore, when the brackets are disaligned, the beam ends may bind on the brackets interfering with their sliding on the brackets.

Lengthwise tilting of the side frames is aggravated by non-uniformly worn wheel treads, journals, journal bearings and wedges, or by variations in wheel diameters and in side frames. Relative vertical movement of the side frames as well as tilting in various directions may occur when the truck rounds a curve or passes over track where the rails are uneven.

The main object of the invention is to overcome the above-indicated disadvantages by providing means at one or both ends of the beam for angular movement of the entire brake beam or one or more of its members relative to the adjacent side frame to relieve torsion and shear forces on the beam when the beam supporting brackets become disaligned. The beam may further be supported from the truck frame by a third point support, disaligned transversely of the beam with the axis of rotation of the beam, to hold the beam against rotation when angular tilting movement of the beam is provided at both of its ends.

Another object is to provide an adjustable head type beam, in which each brake head may rotate relative to the beam members and automatically align the brake shoe with the associated wheel tread, with a part carried by the head for slidably mounting the beam from an adjacent bracket on the truck framing.

These and other objects will be apparent to those skilled in the art from the following description and accompanying drawings, in which.

Figure 3:
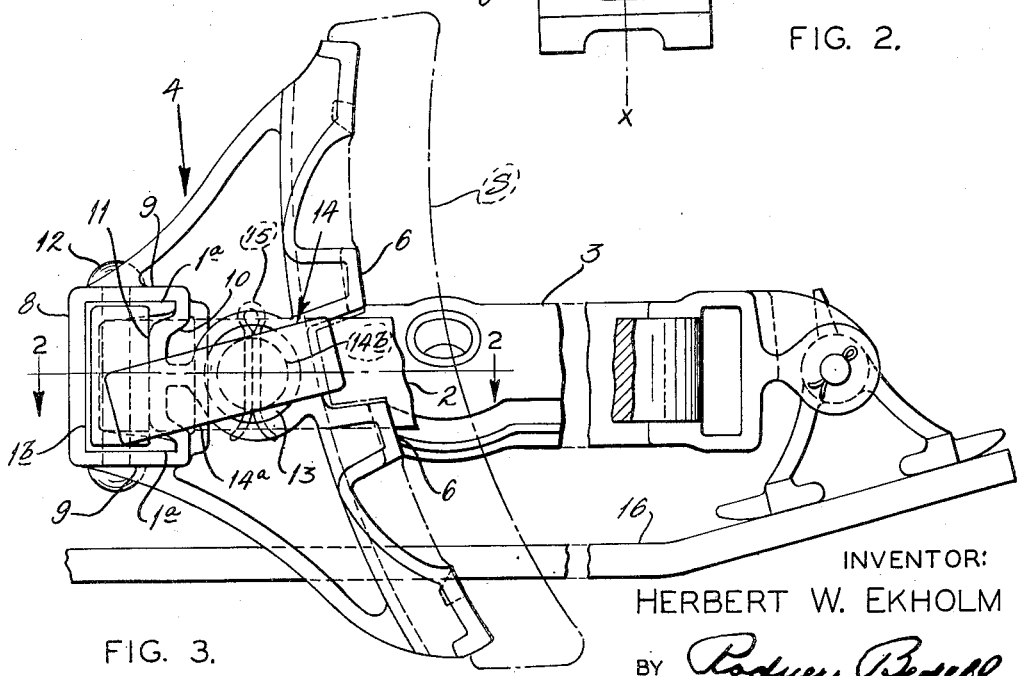
Figure 3 is an end view of the beam.
Figure 4:
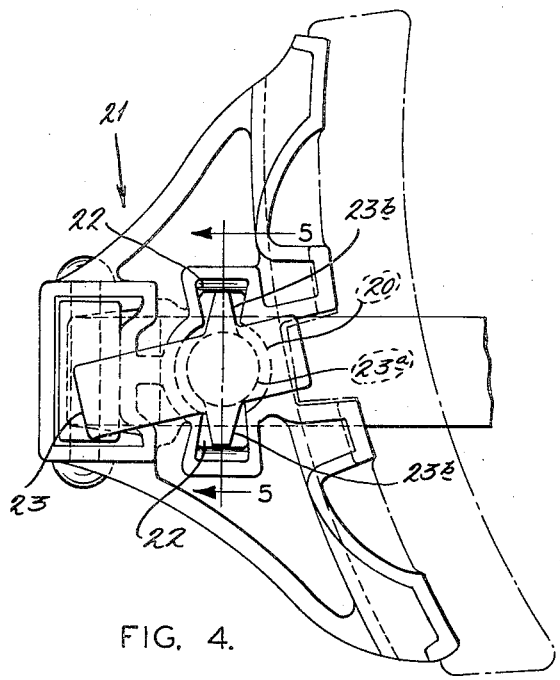

Figure 4 corresponds to Figure 3 but shows another form of the invention.

Figure 5:
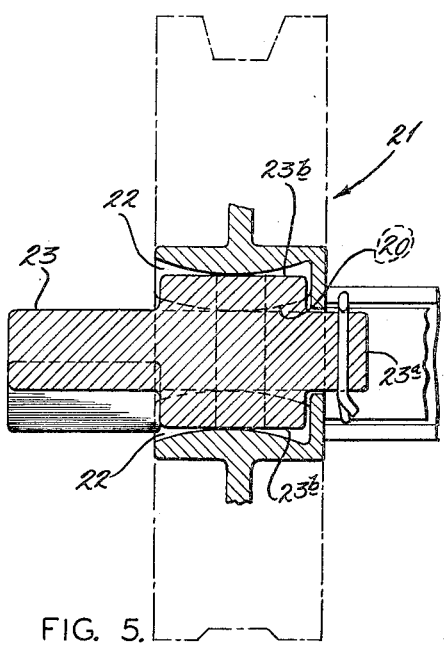

Figure 5 is a vertical section taken approximately on the line 5—5 of Figure 4.

Figures 6, 7:
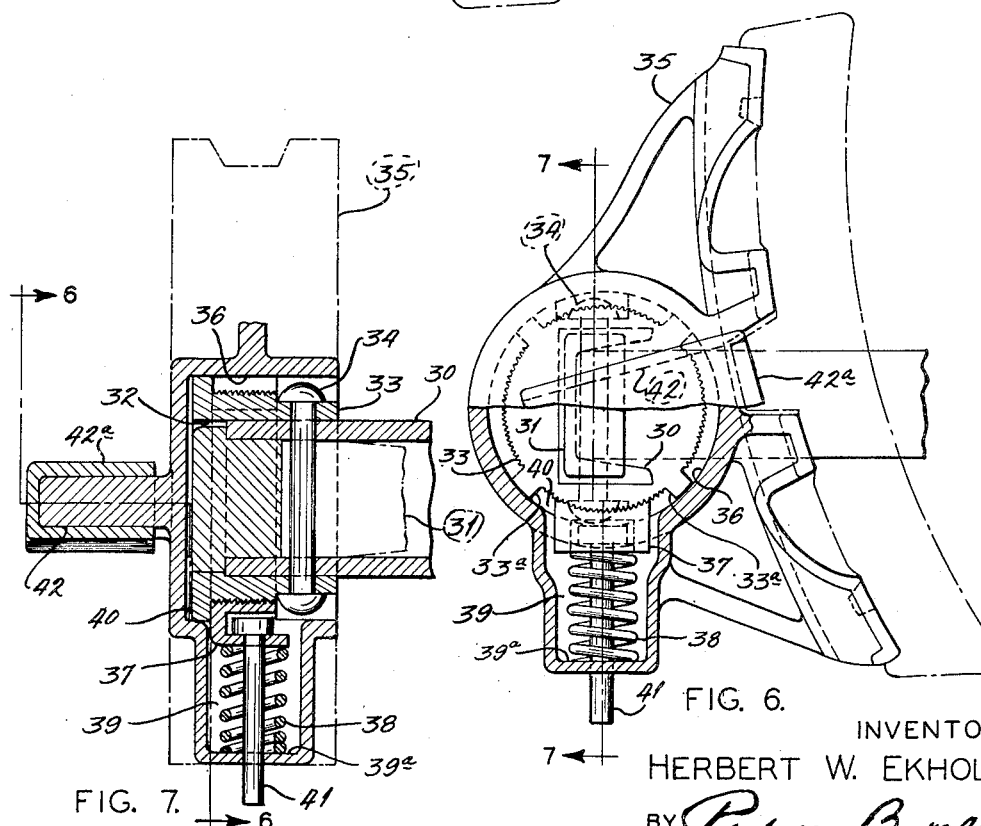

Figure 6 is in part an end view and in part a transverse vertical section taken approximately on the line 6—6 of Figure 7 and shows another form of the invention.

Figure 7 is a longitudinal vertical section taken approximately on the line 7—7 of Figure 6.

Figure 1:
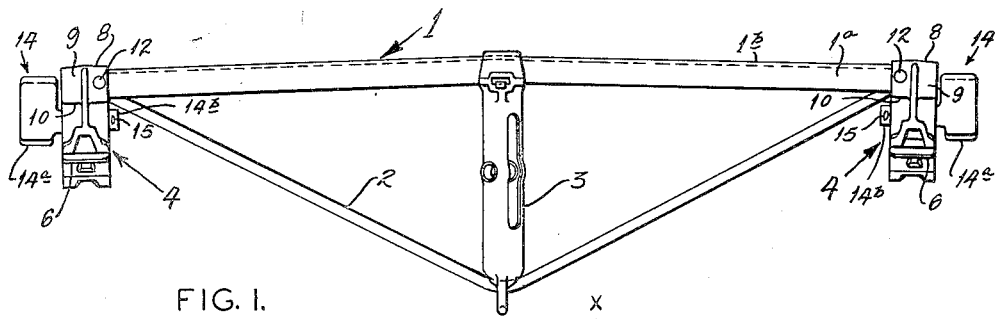
Figure 1 is a top view of a truss type brake beam constructed according to the invention.
Figure 2:
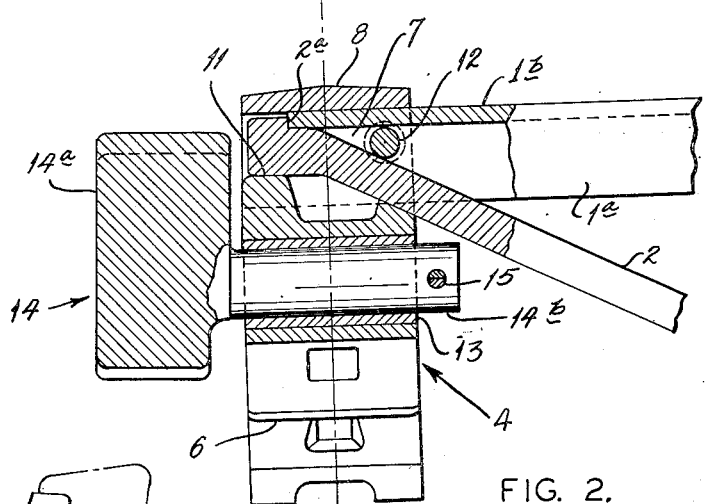
Figure 2 is a horizontal section through the left-hand end of the beam and taken approximately on the line 2—2 of Figure 3.

The brake beam shown in Figures 1-3 includes a compression member 1 of channel-shaped cross section, a tension member 2 of rectangular cross-section and a strut 3 intermediate the ends of the beam. The adjacent end portions of the compression and tension members converge, each end portion of the tension member being received between the compression member flanges 1a and engaging the inner face of the compression member web 1b. A lip 2a on the end of the tension member is seated against the ends of the compression member web and flanges. A brake head 4 is mounted on each end of the beam and includes forwardly projecting lugs 6 for mounting a brake shoe S. A passage 7 extends from side to side through the brake head body and receives the end portions of the tension and compression members. The back wall 8 of the passage engages web 1b of the compression member and the top and bottom walls 9 of the passage engage the compression member flanges 1a. The front wall 10 of the passage engages the forward edges of flanges 1a of the compression member and an offset 11 in front wall 10 engages the forward face of the tension member.

The tension member meets and engages the compression member web 1b outwardly of the beam beyond the center line of thrust of the brake head indicated in Figure 2 by the dot-dash line x—x. A vertically disposed rivet 12, adjacent tension member 2 and positioned inwardly of the center line of thrust x—x, passes through top and bottom walls 9 of the brake head and compression member flanges 1a. The above structure is described and claimed in a copending application Serial No. 4,738, filed January 28, 1948, by Irwin J. Spaeth.

Each brake head 4 has a bearing 13 extending transversely therethrough substantially parallel to passage 7 and positioned between passage 7 and lugs 6. A part 14 has a journal 14b mounted for rotation in bearing 13 and has an outer extension 14a with elongated bracket engaging faces extending transversely of the beam for slidably mounting the beam from an adjacent bracket (not shown) on the truck framing. A cotter pin 15 extends through the inner end of journal 14b and maintains part 14 assembled to the brake head.

With this arrangement, the brake beam is guided in its movement to and from wheel engaging position and relative angular movement between one or both of the side frames and the brake beam transversely of the latter is provided to accommodate relative lengthwise tilting movement of the side frames without torsion on the brake beam. The front end of the strut may be supported from the truck frame by a third point support 16 disaligned transversely of the beam with bearings 13 to hold the beam against rotation so the brake shoes are properly positioned relative to the wheel treads as the brakes are applied thereto. The strut may be positioned substantially parallel to the supporting parts and inclined to the horizontal or the strut may be positioned horizontally and disposed at an angle to the supporting parts.

The brake beam shown in Figures 4 and 5 is similar to that previously described with the exception that rotational movement of part 23 relative to brake head 21 is limited. The brake head bearing 20 in each brake head 21 is recessed at 22 and the journal 23a of part 23 has radial extensions 23b extending into recesses 22. Lugs 23b and the associated recesses 22 extend at any desired angle relative to the associated bracket engaging part 23 so that the strut and tension and compression members may be positioned either in a horizontal plane or parallel to part 23.

Bearing 20 is convexed lengthwise of the journal so that journal 23a may rock transversely of the brake head. In addition to accommodating relative lengthwise tilting movement of the side frames without torsion on the brake beam, the structure shown in Figures 4 and 5 accommodates relative vertical movement of the side frames without shear forces on the beam.

Figures 6 and 7 show an adjustable head type beam in which the adjacent converging end portions of the compression member 30 and the tension member 31 at each end of the beam are received in a passage 32 in a substantially cylindrical end member 33. A vertically disposed rivet 34 extends through each end member 33 and compression member 30 adjacent tension member 31 and maintains assembly of the beam members.

A brake head 35 having a substantially cylindrical recess 36 for receiving end member 33 is mounted for relative rotation on each end member 33. A pawl 37 has a curved serrated face engaging a serrated portion of the periphery of end member 33. A compression spring 38 is received within a pocket 39 connecting recess 36 in brake head 35 and is seated at one end on the bottom wall 39a of pocket 39 and at the other end on pawl 37 and urges the pawl into engagement with end member 33.

Lugs 33a on the periphery of end member 33 engage pawl 37 and limit relative rotation of brake head 35 and end member 33. Lugs 33a on end member 33 may be disposed to position the strut and tension members in either a horizontal or inclined plane. In addition, the forward end of the beam may be supported from the truck frame by a third point support as described in Figures 1–3 to hold the beam members against rotation relative to the brake heads.

A peripheral flange 40 on the outer end of end member 33 engages pawl 37, and maintains the brake head in assembly with the end member. A plunger 41, coaxial with spring 38, engages pawl 37 and extends through bottom wall 39a of pocket 39. By pulling downwardly on plunger 41 against the force of spring 38, pawl 37 may be disengaged from end member 33 and clear flange 40 so the brake head may be removed from the end member.

A part 42 rigid with each brake head 35 extends outwardly of the beam and slidably mounts the beam from an adjacent bracket (not shown) on the truck framing. A wear plate 42a is rigid with part 42. The brake heads are guided in their movement to and from wheel engaging positions and relative angular movement about the longitudinal beam axis is provided between the side frames and the brake beam members to accommodate relative lengthwise tilting movement of the side frames without torsion on the brake beam.

Although special structure has been provided in Figures 4 and 5 to accommodate relative vertical movement of the truck side frames without placing the beam members under shear, the structures shown in Figures 1–3 and 6 and 7 also may accommodate limited relative vertical movement of the side frames. Each supporting part may be narrower than the associated brackets on the truck side frame to allow the part to tilt slightly in the bracket when the opposite end of the beam is raised or lowered.

The details of construction may be varied substantially without departing from the spirit of the invention, and the exclusive use of those modifications coming within the scope of the claims is contemplated.

What is claimed is:

1. In a railway truss type brake beam, a compression member and a tension member with their adjacent end portions converging, a brake head at each end of the beam mounted on the associated end portions, and a separate part at each end of the beam rotatable relative to the brake head and having an extension elongated transversely of the beam and extending outwardly of the brake head and adapted to engage an adjacent bracket.

2. Structure as defined in claim 1 in which each brake head includes a bearing and the associated part has a journal mounted for rotation in the brake head bearing.

3. In a railway truss type brake beam, a compression member and a tension member with their adjacent end portions converging, a brake head including a bearing mounted on associated end portions, and a part having a journal rotatable in the brake head bearing, said part extending outwardly of the brake head and having an extension elongated transversely of the beam and adapted to engage an adjacent support bracket.

4. Structure as defined in claim 3 in which the brake head bearing and the part journal have interengaging elements to limit rotational movement of the part relative to the head.

5. In a railway truss type brake beam, a compression member and a tension member with their adjacent end portions converging and interengaging, a brake head at each end of the beam mounted on the associated end portions and maintaining interengagement of the end portions and including elements for mounting a brake shoe, adjacent end portions meeting and engaging each other at a distance from the middle of said beam at least as far as the center line of thrust of the corresponding brake head is spaced from the middle of the beam, a securing device maintaining assembly of each brake head to said members, and a separate part extending outwardly of each brake head for slidably mounting the beam on an adjacent bracket on the truck framing and providing for angular movement of the brake beam relative to the bracket about an axle extending longitudinally of the beam, said brake head including a bearing having a recess and said part including a journal mounted for rotation in said bearing and having a radial extension projecting into said bearing recess to limit rotational movement of the part relative to the head.

6. In a railway truss type brake beam, a compression member and a tension member with their adjacent end portions converging and interengaging, a brake head mounted on associated end portions and maintaining interengagement of said end portions and including a transverse bearing and elements for mounting a brake shoe, said end portions meeting and engaging each other outwardly of the beam beyond the center line of thrust of said brake head, a securing device maintaining assembly of said brake head to said members, a part having a journal mounted for rotation in said brake head bearing and extending outwardly of said brake head and having faces elongated transversely of the beam for slidably mounting the beam on an adjacent support bracket, said part providing for angular movement of the brake beam relative to the bracket about an axis extending longitudinally of the beam.

7. In a railway truss type brake beam, a compression member and a tension member with their adjacent end portions converging, a brake head at each end of the beam mounted on the associated end portions and including a bearing having a recess, and a part having a journal mounted for rotation in the brake head bearing and having a radial extension extending into the bearing recess to limit rotational movement of said part relative to said brake head, said part extending outwardly of the brake head and being adapted to engage an adjacent support bracket.

8. In a railway truss type brake beam, a compression member and a tension member with their adjacent end portions converging, an end member mounted on associated end portions, a brake head mounted for rotation on said end member, and a part extending outwardly of said head and rigid therewith and adapted to slidably mount the beam from an adjacent support bracket.

9. In a railway truss type brake beam, a compression member and a tension member with their adjacent end portions converging, an end member at each end of the beam mounted on associated end portions, a brake head mounted for rotation on each of said end members, a part rigid with each of said heads and extending outwardly thereof and adapted to slidably mount the beam from an adjacent support bracket, and a support disaligned transversely of the beam with the axis of rotation of the brake heads to hold the beam members against rotation relative to the support brackets.

10. In a railway truss type brake beam, a compression member and a tension member with their adjacent end portions converging and interengaging, a substantially cylindrical end member mounted on the associated end portions and maintaining said end portions in interengagement, and a brake head having a substantially cylindrical recess for receiving said end member and mounted for relative rotation on said end member, and a part extending outwardly of said head and rigid therewith and adapted to slidably mount the beam from an adjacent bracket.

11. In a railway truss type brake beam, a compression member and a tension member with their adjacent end portions converging, a substantially cylindrical end member having radially extending spaced lugs and mounted on the associated end portions, and a brake head having a substantially cylindrical recess receiving said end member and mounted for rotation thereon, a pawl mounted yieldingly on said brake head and frictionally engaging said end member between said lugs to limit rotation of said brake head relative to said end member, and a part extending outwardly of said head and rigid therewith and adapted to slidably mount the beam from an adjacent support bracket.

12. A brake head for a railway truss type brake beam comprising lugs for mounting a brake shoe, a bearing extending transversely of the head, and a part with a journal mounted for rotation in said bearing and with a projection elongated lengthwise of the head for engaging a support.

13. Structure as described in claim 12 in which the bearing and the journal have interengaging elements to limit their relative rotational movement.

14. A brake head for a railway truss type brake beam having elements for mounting a brake shoe, a bearing extending transversely of the head, and a part having a journal mounted for rotation in said bearing, the bearing being convexed lengthwise of the journal for angular movement of the part transversely of the brake head.

15. Structure as described in claim 14 in which the bearing is recessed and the journal has a radial extension extending into the recess to limit rotational movement of the part in its bearing.

16. In end structure for a railway truss type brake beam, a substantially cylindrical end member adapted to be mounted on the end of the beam, a brake head having a substantially cylindrical recess to receive said end member and mounted for rotation relative thereto, and a part rigid with said brake head and extending outwardly thereof for supporting the head from an adjacent support bracket.

17. In end structure for a railway truss type brake beam, a substantially cylindrical end member having radially extending spaced lugs and adapted to be mounted on the end of the beam, a brake head having a substantially cylindrical recess to receive said end member and mounted for rotation relative thereto, a pawl yieldingly mounted on said brake head and adapted to frictionally engage said end member between said lugs to limit rotation of said brake head relative to said end member, and a part rigid with said brake head and extending outwardly thereof for supporting the head from an adjacent support bracket.

18. In end structure for a railway truss type brake beam, a substantially cylindrical end member having a peripheral flange and radially extending spaced lugs and a passage adapted to receive the adjacent converging end portions of a tension and compression member, a brake head having a substantially cylindrical recess to receive said end member, a pawl yieldingly mounted on said head in frictional engagement with said end member between said lugs and adjacent said flange to limit rotation of said brake head relative to said end member and to maintain assembly of said brake head to said end member, and a part rigid with said brake head and extending outwardly thereof for engaging an adjacent support bracket.

19. In a railway truss type brake beam, a compression member and a tension member with their adjacent end portions converging, a brake head at each end of the beam mounted on the associated end portions, and a part mounted on each of said heads for slidably mounting the beam from an adjacent bracket for movement of said beam to and from wheel engaging position, said parts having elongated bracket engaging faces extending transversely of the beam, and said parts being mounted for rotation relative to one another and to said beam members about an axis extending longitudinally of the beam.

20. In a railway truss type brake beam, a compression member and a tension member with their adjacent end portions converging, a brake head including a bearing mounted on associated end portions, a part having a journal rotatable in the brake head bearing, said part extending outwardly of the brake head and having an extension elongated transversely of the beam and adapted to engage an adjacent support bracket, and a non-rotative device spaced from said head longitudinally of the beam and disposed to engage an associated truck part to limit the relative rotation of the beam and said head.

21. A railway truss type brake beam as specified in claim 8 which also includes a member spaced from said end member and adapted to slidably engage an adjacent bracket and limit the relative rotation of the brake head and beam.

HERBERT W. EKHOLM.

REFERENCES CITED

The following references are of record in the file of this patent:

UNITED STATES PATENTS

| Number | Name | Date |
|---|---|---|
| 325,964 | Packard | Sept. 8, 1885 |
| 485,823 | Robischung | Nov. 8, 1892 |
| 1,082,495 | Busse | Dec. 30, 1913 |
| 1,198,999 | Dunaway | Sept. 19, 1916 |
| 1,315,932 | Conrath | Sept. 9, 1919 |
| 1,385,730 | Tatum | July 26, 1921 |
| 2,398,917 | Busch | Apr. 23, 1946 |